United States Patent
Cassone et al.

(10) Patent No.: US 8,155,996 B1
(45) Date of Patent: Apr. 10, 2012

(54) SYSTEM AND METHOD FOR CUSTOMER CARE COMPLEXITY MODEL

(75) Inventors: Deandra T. Cassone, Overland Park, KS (US); Paul Harris, Lee's Summit, MO (US); Douglas Matia, Alexandria, VA (US); Mark Schmitz, Olathe, KS (US); Randy Tracy, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1070 days.

(21) Appl. No.: 12/043,598

(22) Filed: Mar. 6, 2008

(51) Int. Cl.
*G06Q 10/00* (2012.01)
(52) U.S. Cl. ............... 705/7.36; 705/7.22; 705/7.23
(58) Field of Classification Search ............... 705/7.36
See application file for complete search history.

(56) References Cited

U.S. PATENT DOCUMENTS

| | | | | |
|---|---|---|---|---|
| 5,189,606 A * | 2/1993 | Burns et al. | ............... | 705/7.23 |
| 5,459,656 A * | 10/1995 | Fields et al. | ............... | 705/7.22 |
| 5,712,985 A * | 1/1998 | Lee et al. | ............... | 705/7.31 |
| 6,044,354 A * | 3/2000 | Asplen, Jr. | ............... | 705/7.13 |
| 6,249,770 B1 * | 6/2001 | Erwin et al. | ............... | 725/35 |
| 6,493,697 B1 * | 12/2002 | Stier et al. | ............... | 706/50 |
| 6,950,802 B1 * | 9/2005 | Barnes et al. | ............... | 705/7.22 |
| 7,089,172 B2 * | 8/2006 | Lines et al. | ............... | 703/21 |
| 7,313,531 B2 * | 12/2007 | Chappel et al. | ............... | 705/7.17 |
| 7,617,117 B2 * | 11/2009 | Starkey | ............... | 705/7.22 |
| 7,676,490 B1 * | 3/2010 | Cassone et al. | ............... | 707/805 |
| 7,742,939 B1 * | 6/2010 | Pham | ............... | 705/7.39 |
| 7,865,381 B2 * | 1/2011 | Eagle et al. | ............... | 705/7.11 |
| 7,881,961 B2 * | 2/2011 | Ricketts | ............... | 705/7.12 |
| 7,930,203 B2 * | 4/2011 | Barnes et al. | ............... | 705/7.23 |
| 7,949,663 B1 * | 5/2011 | Cassone et al. | ............... | 707/750 |
| 7,957,991 B2 * | 6/2011 | Mikurak | ............... | 705/7.11 |
| 7,983,946 B1 * | 7/2011 | Cassone et al. | ............... | 705/7.36 |
| 8,005,706 B1 * | 8/2011 | Cassone et al. | ............... | 705/7.28 |
| 2002/0123983 A1 * | 9/2002 | Riley et al. | ............... | 707/1 |
| 2002/0184069 A1 * | 12/2002 | Kosiba et al. | ............... | 705/8 |
| 2002/0188488 A1 * | 12/2002 | Hinkle | ............... | 705/8 |
| 2003/0004766 A1 * | 1/2003 | Sandoval et al. | ............... | 705/7 |
| 2003/0033586 A1 * | 2/2003 | Lawler | ............... | 717/101 |
| 2003/0074291 A1 * | 4/2003 | Hartung et al. | ............... | 705/35 |
| 2003/0135399 A1 * | 7/2003 | Ahamparam et al. | ............... | 705/7 |
| 2003/0176993 A1 * | 9/2003 | Lines et al. | ............... | 703/22 |
| 2003/0216926 A1 * | 11/2003 | Scotto et al. | ............... | 705/1 |

(Continued)

OTHER PUBLICATIONS

Aladwani, A., "An Integrated Performance Model of Information Systems Projects", Journal of Management Information Systems. Sharpe:Summer 2002. vol. 19, Iss. 1, pp. 185-210.*

(Continued)

*Primary Examiner* — Beth V Boswell
*Assistant Examiner* — Tiphany Dickerson (57) ABSTRACT

A system for customer care complexity management is disclosed that comprises a processor, a customer care index forecast module, and a project launch capability assessment and threshold module. The customer care index forecast module establishes a customer care index forecast model based on a plurality of historical customer care data and a plurality of historical performance metrics data. The customer care index forecast module also forecasts a customer care index using the established customer care index forecast model and a plurality of projected performance metrics data. The project launch capability assessment and threshold module identifies a number of projects to be launched in a current project launch plan based on the forecast customer care index and a pipeline project complexity index for the project launch plan. The project launch capability assessment and threshold module also identifies an adjustment to the project launch plan.

18 Claims, 4 Drawing Sheets

U.S. PATENT DOCUMENTS

| | | | | |
|---|---|---|---|---|
| 2004/0068431 | A1* | 4/2004 | Smith et al. | 705/10 |
| 2004/0098300 | A1* | 5/2004 | Karwatowski et al. | 705/11 |
| 2005/0004789 | A1* | 1/2005 | Summers | 703/22 |
| 2005/0021384 | A1* | 1/2005 | Pantaleo et al. | 705/9 |
| 2005/0228707 | A1* | 10/2005 | Hendrickson | 705/8 |
| 2006/0190391 | A1* | 8/2006 | Cullen et al. | 705/37 |
| 2007/0174702 | A1* | 7/2007 | Meyer | 714/33 |
| 2007/0192170 | A1* | 8/2007 | Cristol | 705/10 |
| 2007/0234301 | A1* | 10/2007 | Garvey et al. | 717/124 |
| 2008/0082957 | A1* | 4/2008 | Pietschker et al. | 717/101 |

OTHER PUBLICATIONS

Bardhan, I., Bagchi, S., Sougstad, R., "Prioritizing a Portfolio of Information Technology Investment Projects" Journal of Management Information Systems. Armonk:Fall 2004. vol. 21, Iss. 2, pp. 33-60.*

Blazevic, V., "Antecedents of Project Learning and Time-to Market During New Mobile Service Development" Int'l Journal of Service Industry Management (2003). vol. 14, Iss. 1, pp. 120-147.*

Jost, A., Lorenz, T., and Mischke, G., "Modeling the Innovation-Pipeline", Conference Proceedings: The 23rd International Conference of the System Dynamics Society, Jul. 17-21, 2005 Boston (27 pages).*

Huber, T., "Maximizing Success in Lean Project Management Leadership" (Presentation Supporting Paper) IIE Annual Conference. Proceedings. Norcross:2002. pp. 1-10.*

Pritchard, M., Silvestro, R., "Applying the service profit chain to analyse retail performance: The case of the managerial strait-jacket?" International Journal of Service Industry Management. Bradford:2005. vol. 16, Iss. 3/4, pp. 337-356.*

Raffo, D.M., Harrison, W., and Vandeville, J., Coordinating Models and Metrics to Manage Software Projects Int'l J. Software Process Improvement and Practice, (2000) vol. 5, Nos. 2/3, pp. 159-168.*

Ssemaluulu, P., and Williams, D., "Complexity and Risk in IS Projects: A System Dynamics Approach" Advances in Systems Modelling and ICT Applications (2007), pp. 243-250.*

Weyuker, E.J., Avritzer, A., "A metric for predicting the performance of an application under a growing workload" IBM Systems Journal. Armonk:2002. vol. 41, Iss. 1, pp. 45-54.*

"Strategic Planning in the Payroll Department", IOMA's Payroll Manager's Report, Nov. 2006, Accounting & Tax Periodicals, p. 15.*

* cited by examiner

SYSTEM AND METHOD FOR CUSTOMER CARE COMPLEXITY MODEL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Customer care specialists may provide support to a company's sale activities. For example, the customer care specialists may help explain to existing or prospective customers the sale of a new product feature or a service promotion plan, and may also provide technical tutoring on how to use the new product feature. The customer care specialists also may need to handle customer complaints and direct the customer to the appropriate help desk or escalate an issue to a proper level of authority for prompt attention. In keeping with the trend of globalization, the customer care specialists of a telecommunication provider may be geographically dispersed and globally distributed.

SUMMARY

In one embodiment, a system for customer care complexity management is provided that comprises a processor, a customer care index forecast module, and a project launch capability assessment and threshold module. The customer care index forecast module is configured, when executed by the processor, to establish a customer care index forecast model based on a plurality of historical customer care data and based on a plurality of historical performance metrics data. The customer care index forecast module is further configured, when executed by the processor, to forecast a customer care index using the established customer care index forecast model and using a plurality of projected performance metrics data. The project launch capability assessment and threshold module is configured, when executed by the processor, to identify a number of projects to be launched in a current project launch plan based on the forecast customer care index and based on a pipeline project complexity index for the project launch plan. The project launch capability assessment and threshold module is further configured, when executed by the processor, to identify an adjustment to the project launch plan.

In another embodiment, a method for customer care complexity management is provided that comprises collecting a plurality of historical performance metrics data, a plurality of estimated performance metrics data for a current project launch plan, and a plurality of customer care data, and establishing a customer care index forecast model using the plurality of historical performance metrics data and using the plurality of customer care data. The method also includes producing a first forecast customer care index based on the established customer care index forecast model and based on the plurality of estimated performance metrics impact data, identifying a project launch capacity based on the forecast customer care index, and identifying an adjustment to a current project launch plan based on the identified project launch capacity.

In a further embodiment, a method for customer care complexity management is provided that comprises collecting a plurality of historical performance metrics data, a plurality of estimated performance metrics impact data for a current project launch plan, a plurality of historical project complexity data, a plurality of estimated project complexity data for the current project launch plan, and a plurality of customer care data, and producing a pipeline project complexity index based on the plurality of historical project complexity data and based on the plurality of estimated project complexity data. The method also includes establishing a customer care index forecast model using the plurality of historical performance metrics data and using the plurality of customer care data, producing a forecast customer care index based on the customer care index forecast model and based on the plurality of estimated performance metrics impact data, identifying a project launch capacity based on the forecast customer care index and based on the project complexity index, and adjusting the current project launch plan based on the project launch capacity and based on the project complexity index.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In business enterprises multiple development and/or marketing initiatives may be pursued concurrently. In some cases, different managers and/or different projects are responsible for these separate projects. The collection of these projects may be viewed as a pipeline of projects. In managing this pipeline of projects, typically development resources and development costs are analyzed and taken into consideration. A challenge which may have been neglected, however, is consideration of the impact of the concurrent roll-out of the projects by customer care specialists. If well designed and prepared projects are deployed by overloaded and/or under-trained customer care specialists, the resulting poor customer service that may be provided may decrease overall customer satisfaction. The present disclosure teaches using this understanding of the impact of loading and/or training of customer care specialists as a governing mechanism or a throttling mechanism on the project pipeline. Additionally, the present disclosure teaches the understanding that there are some cumulative learning effects that may influence the quality of care provided. For example, a large amount of complexity or new learning material introduced into the customer care staff during a previous week or other appropriate unit of time may have a carry-over effect in a subsequent week or other appropriate unit of time.

Customer care specialists may use a large number of tools and handle a large amount of data in technology-intensive industries such as telecommunications. The customer care specialists in general may need a certain level of education and continuing training in order to provide efficient customer care and support in a technology-intensive industry such as telecommunications. New projects are launched on a continuous basis, and a new project launch plan, which may include a number of project launches for a launch window, may impact the overall level of customer satisfaction in a number of ways. For example, the level of complexity of the project launch plan may impact the performance of the customer care specialists, and the customer care specialist's performance may be closely related to customer satisfaction. The customer care specialists need to access a large amount of data in a short period of time and need to learn to use a large number of tools in order to perform customer care functions. For example, the customer care specialists may need to use over several hundred tools in their regular job function. The customer care specialists may have limited amount of time to learn and train, and therefore the levels of technical complexity of new projects and the level of working environment complexity (e.g., outsourcing around the world) may have direct impact on the performance of the customer care specialists.

The performance of the customer care specialists may be measured using performance metrics data. The performance metrics data may include data attributes such as the percent of issues resolved, quality assurance scores, the number of customer calls received, the number of the incoming calls handled, and the average call handling time, among many others. The performance metrics data may be collected from a network operation system on a regular basis such as hourly, daily, or weekly basis.

The present disclosure provides a customer care complexity management system that may produce a model to forecast a customer satisfaction level measured by a customer care index for a project launch plan before the project launch plan is carried out. The present disclosure may also provide a method to make an adjustment to the project launch plan to manage the number of new project launches and the complexity of the project launch plan to achieve a projected customer satisfaction level.

Figure 1:
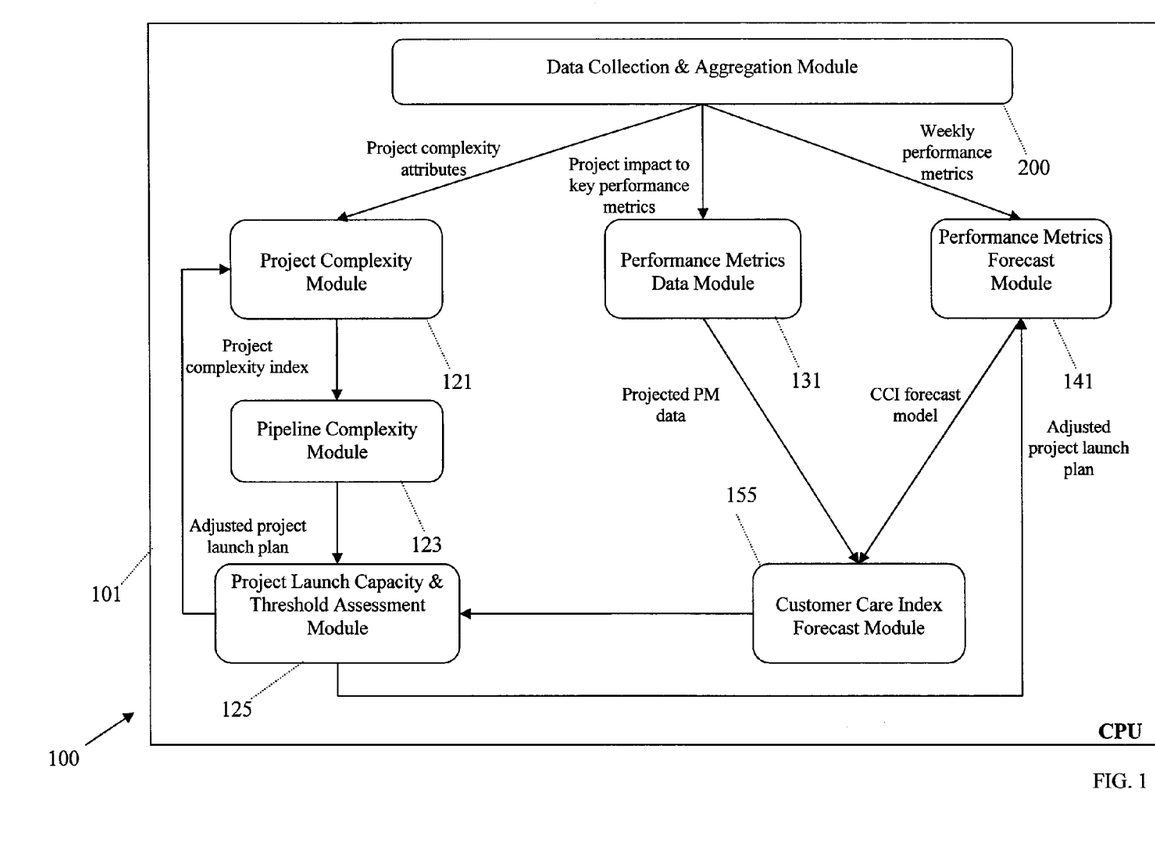
FIG. 1 illustrates a customer care complexity management system according to some embodiments of the present disclosure.
Figure 2:
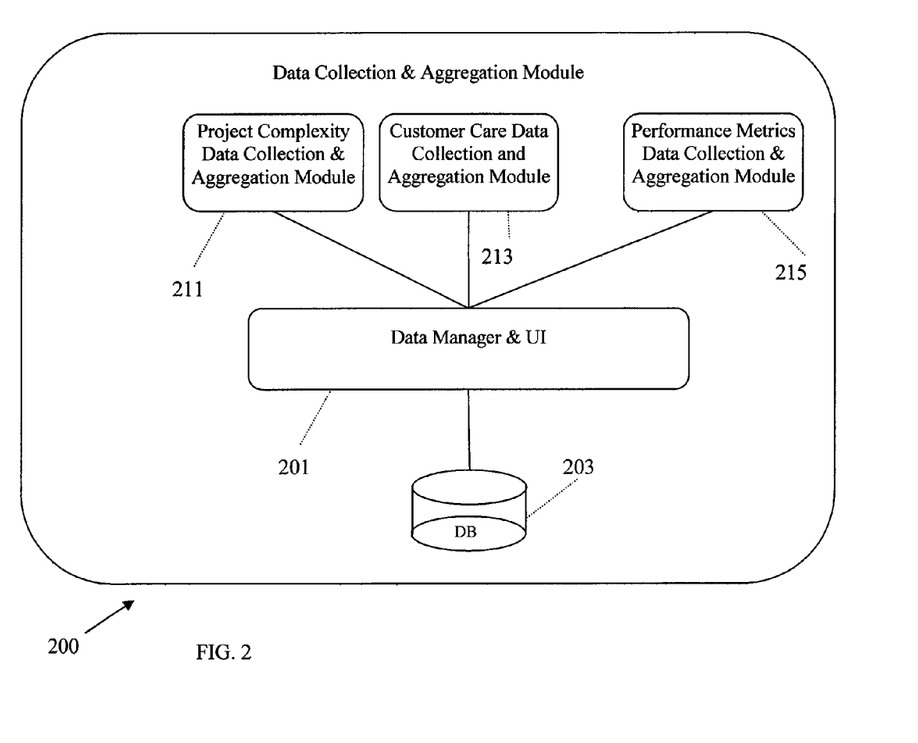
FIG. 2 illustrates a data collection and aggregation module according to some embodiments of the present disclosure.

FIG. 1 illustrates a customer care complexity management system 100 according to some embodiments of the present disclosure. The customer care complexity management system 100 may include a data collection and aggregation module 200, a project complexity module 121, a pipeline complexity module 123, and a project launch capacity and threshold assessment module 125. The customer care complexity management system 100 may also include a performance metrics data module 131, a performance metrics forecast module 141, and a customer care index forecast module 155. The customer care complexity management system 100 may be implemented on a CPU 101. The project complexity data attributes and performance metrics data attributes are described below, and the data collection module 200 is illustrated in FIG. 2 and described hereinafter.

The project complexity module 121 may take as input the project complexity attribute data from the data collection and aggregation module 200 and produce an aggregated project complexity index. The project complexity module 121 may be configured with algorithms and logic to aggregate the project complexity attribute data to produce a project complexity index for a project in the project launch plan. The project complexity attribute data for a single project in a project launch plan may be aggregated to arrive at a project-wide project complexity index, and then project complexity index of all projects in the project launch plan may be aggregated to obtain a project complexity index for the entire project launch plan. In an embodiment, the project complexity index is a number between 0 and 62 to indicate the complexity level of a project or project launch plan. For example, a project complexity index of 10 may indicate a low level of project complexity while a project complexity index of 45 may indicate a higher level of project complexity. In another embodiment, the project complexity index may be a number between 0 and 1 to indicate the complexity level of a project or project launch plan. For example, for a simple project, a project complexity index of 0.15 may indicate a low level of project complexity while a project complexity index of 0.75 may indicate a higher level of project complexity. In other embodiments, other ranges of project complexity index may be employed. The project complexity attribute data may include several areas. In some embodiments, the project complexity attributes or complexity factors may include a concept delivery and knowledge retention area, an operation area, a product and device area, and a marketing area. In some other embodiments, other complexity attributes for the project launch may also be used.

The concept delivery and knowledge retention area of project complexity attributes may include the project complexity attributes such as a customer care delivery method, a customer care specialist learning time period, a time for a customer care specialist to become efficient, and a specialized knowledge. The effect of taking account of the time it takes for a customer care specialist to become efficient is that complexity introduced in earlier weeks or time periods impacts the ability of the customer care specialist corps to absorb further complexity in subsequent proximate time intervals. In effect, a learning curve is involved in absorbing complexity and becoming proficient with the new information. In an embodiment, the customer care specialist learning time period may not be measured and hence may not be included. The customer care delivery method refers to the method to be used to deliver the new project or feature to the customer care specialist and may include customer care specialist training, pre-shift coaching, or on-line communications. The learning time refers to the amount of time it takes for the customer care specialists to learn to use the new feature. The time to become efficient, or efficiency time period, refers to the amount of time it takes for the customer care specialist to become efficient in providing customer care on the new feature. The specialized or special knowledge refers to whether the new feature requires specialized knowledge on the part of the customer care specialist.

The operation area of the project complexity attributes may include project complexity attributes such as a difficulty level of adopting the new project, a policy statement impact, and an involvement of another organization. In an embodiment, preferred complexity attributes may include a difficulty associated with implementing the process and/or system, how frequently the customer care representative will need to apply the subject information from the project, how important it is for the customer care specialist to be well informed about the subject information from the project, and how thorough is the cross-functional implementation of the project. In an embodiment, the difficulty associated with implementing the process and/or system may have about three times the weight or impact as the frequency of use of the subject information, the importance for the customer care specialist to know the subject information, and the cross-functional implementation. The difficulty level may indicate the difficulty level of using the tools or systems that the customer care specialists need to access in order to trouble shoot a customer issue regarding the new feature or project. The policy statement impact refers to the degree to which the new project would impact the current policy statement the customer care specialists read to the customers. The involvement of another organization may refer to the degree to which other organizations are involved in the new project launch and, in some embodiments, which other organizations are involved.

The device and product area of the project complexity attributes may include project complexity attributes such as a device complexity level of a new phone or device and a feature complexity level. The device complexity level refers to the level of complexity of a new device or phone if the new phone or device is introduced. The feature complexity level refers to the level of complexity of a feature on the new product or phone.

The marketing area may include project complexity attributes such as a marketing initiative type, a replacement for an older marketing initiative, and a level of dependency. The marketing initiative type may refer to the type of a new marketing initiative involved in the project launch, the type such as rebate, pricing plan, or flyer. The replacement for an older marketing initiative may refer to whether the new marketing initiative would replace the existing marketing initiative. The level of dependency may refer to the degree to which the new marketing initiative depends on other marketing initiatives and plans.

The pipeline complexity module 123 may aggregate project complexity indices of multiple project launch plans over a longer period of time, such as several weeks, to obtain an accumulated project complexity index. The project complexity index for the project launch plan of the current week may be added to the project complexity indices of the previous weeks to arrive at an accumulated project complexity index. The accumulated project complexity index may indicate the overall level of complexity that the customer care specialists may need to deal with at one time if the current project launch plan is carried out. This accumulated project complexity index recognizes that there may be a saturating effect to account for if new initiatives are loaded on customer care specialists.

The performance metrics data module 131 may take as input an estimated impact of the current project launch plan on the current performance metrics data and arrive at projected performance metrics data. The current performance metrics are a set of data that may be used to measure the performance of customer care specialists for the current week or some other time near to the present time period. In some embodiments, the current performance metrics may include attributes such as a number of incoming calls received by the customer care specialists, a number of calls actually handled by the customer care specialists, a ratio of calls received to the calls handled, an average customer wait time, and an average call handling time per customer, among others. The current performance metrics data may also include an available staff for customer care, a customer retention rate, an actual customer activation rate, and total credit adjustment to be made as a result of the project launch. The performance metrics data may be collected on a regular basis such as an hourly, daily or weekly basis. The performance metrics data module 131 may aggregate the current week's performance metrics data as needed. The estimated impact of the current project launch plan on the current performance metrics data may be obtained via surveys. For example, the project managers may be requested to assign a quantitative value, for example a value from 1 to 10, to the impact of the project launch on the performance metrics data. Alternatively, the project managers may be requested to assign a qualitative descriptor, such as low, medium, or high, to the impact of the project launch on the performance metrics data. Then the estimated impact is applied to the current performance metrics data to obtain the projected performance metrics data.

The performance metrics forecast module 141 may produce a customer care index forecast model based on the historical performance metrics data and the historical customer care index data. A statistical forecast model may be produced through correlating the historical performance metrics data with the historical customer care index data. The statistical forecast mode then may be used to forecast a customer care index or to forecast performance metrics based on a projected customer care index, given the projected performance metrics data. In some embodiments, the performance metrics forecast module 141 may be configured with an exponential smoothing function to smooth out short-term fluctuations in order to obtain a long-term trend in the customer care indices.

The customer care index forecast module 155 may produce a forecast customer care index using the projected performance metrics data and the customer care index forecast model. The customer care index may be one of two component indices, or a combination of the two indices, the customer satisfaction index and customer care specialist performance index. The customer care index forecast module 155 may input the projected performance metrics data into the customer care index forecast to produce the forecast customer care index. The customer care index forecast module 155 may be obtained from the performance metrics data module 131, and the customer care index forecast model may be obtained from the performance metrics forecast module 141.

The project launch capacity and threshold assessment module 125 may suggest an action on the current launch plan based on the project launch pipeline complexity, and the forecast customer care index. In some embodiments, if the project pipeline complexity is above a threshold, it may indicate that the current project launch plan may adversely affect the customer care index to a point that is unacceptable, because the customer care index is expected to indicate general customer satisfaction. If the forecast customer care index is below an acceptable threshold, it indicates that the current project launch plan would result in an unacceptable customer care index if the project launch plan is carried out. In either or both of the above two cases, the project launch capacity and threshold assessment module 125 may consider making an adjustment to the current project launch plan to prevent an unacceptable customer care index result. The corrective action may include moving some projects in the project launch plan scheduled for the current week into a different launch window, reordering the projects in the project launch plan, and dropping one or more projects from the project launch plan, among others. In an embodiment, an initial threshold may be determined based on an analysis of historical complexity over a previous period of time, for example over the previous year and based on a general assessment of whether the complexity levels have been high, low, or about right over the previous year. For example, in one enterprise an average complexity level was determined for a prior operational period when complexity was known to be too high and the initial threshold was determined to be 75% of that average complexity level. Going forward, analysis and evaluation of operations and the customer care index, as well as other considerations, can be correlated with the threshold to tune and adjust the threshold.

The adjusted project launch plan may be input into the project complexity module 121 and the performance metrics forecast module 141, and run through the remaining modules of the customer care complexity management system 100 as described above. The adjusted project launch plan may result in a new project complexity index, a new pipeline project complexity index, and new forecast customer care index. If either or both of the new pipeline project complexity index and the new forecast customer care index do not meet the acceptable threshold value, the above process is repeated. Otherwise, a substantially optimal project launch plan is identified that promotes balancing the number of project launches with maintaining the forecast customer care index at an acceptable level. The customer care complexity management system 100 may be implemented on a general purpose computer which is described hereinafter.

FIG. 2 illustrates a data collection and aggregation module 200 for the customer care complexity management system 100 according to some embodiments of the present disclosure. The data collection and aggregation module 200 may include a project complexity data collection and aggregation module 211, a customer care data collection and aggregation module 213, a performance metrics data collection and aggregation module 215, a data manager and UI 201, and a database 203.

The project complexity data collection and aggregation module 211 may be configured to collect survey data on project complexity and historical project complexity data. The project complexity data for the current project launch plan may be collected via surveys. For example, the project managers may be surveyed to assign quantitative values to the project complexity attributes such as delivery method, level of difficulty, and amount of time for the customer care specialists to learn the new project, among others. The level of difficulty may be a value between 1 to 10, 1 to 100 or a descriptor such as low, medium, and high. In other embodiments, the level of difficulty may have other values. The surveys may be conducted by a third party, and the survey data may be collected either manually or via a tool such as a web-based interactive survey. The historical project complexity data may include surveys or aggregated survey data on previous project launch plans.

The project complexity data collection and aggregation module 211 may help aggregate the project complexity data. The attributes of project complexity such as the level of difficulty and the learning time period may be weighted and then aggregated to arrive at an overall project complexity index. Not all attributes have the same weight because some attributes may be more important than others. The project complexity data collection and aggregation module 211 may allow a user to assign a weight to a project complexity attribute and then aggregate the weighted project complexity attributes into an overall project complexity index value between 0 and 1 for a project in a project launch plan. In another embodiment, the project complexity index value is a number between 0 and 62. In other embodiments, other ranges of project complexity index value may be employed. Weights also may be assigned to the project complexity indices for projects within a project launch plan and weighted project complexity indices may be aggregated to arrive at an aggregated project complexity index for the entire project launch plan.

The customer care data collection and aggregation module 213 may be configured to collect the survey data on customer satisfaction over one or more projects of the project launch plan and the survey data on customer satisfaction over customer care specialist performance. For example, the customers may be surveyed to assign quantitative values to the customer care attributes such as ease of use of a new feature, time to learn to use the feature, and cost saving, among others. The ease of use may be assigned a value between 1 to 10, 1 to 100, or a descriptor such as low, medium, and high, or some other value range. The survey may be conducted by a third party in one or more forms including mailed-out questionnaire, in-person interviews, and web-based interactive survey. The historical customer care data may include the previous surveys or aggregated survey data on previous project launch plans.

The customer care data collection and aggregation module 213 may also aggregate the customer care data. The attributes of customer care such as ease of use and learning time period may be weighted and then aggregated to arrive at an overall customer care index value. Not all attributes have the same weight because some attributes may be more important than others. The customer care data collection and aggregation module 213 may allow a customer to assign a weight to a customer care data attribute and then aggregate the weighted customer care data attributes into an overall customer care index value between 0 and 1, or into an overall customer care index value having a different value range. For example, a customer care index of 0.25 may indicate a low level of overall customer care index or customer satisfaction while a customer care index of 0.75 may indicate a higher level of customer satisfaction.

The performance metrics data collection and aggregation module 215 may be configured to collect historical and current performance metrics data and aggregate the data to a desired granularity level. The performance metrics data, which may include attributes such as the number of customer calls received, the number of calls handled, and the average call handling time, among others, may be collected automatically from a network operation system. The performance metrics data may be collected on a fixed schedule, for example, on a daily or weekly basis. The collected performance metrics data may need to be aggregated to a desired granularity level. For example, the performance metrics data may be collected on a daily basis and may need to be aggregated to a weekly basis to match the data granularity of other data such as customer care data for purpose such as correlating the two sets of data to obtain a forecast model.

The performance metrics data collection and aggregation module 215 also may be configured to collect and aggregate estimated performance metrics impact data. The estimated performance metrics impact data may be used to generate the projected performance metrics data which is used to forecast the customer care index. In some embodiments, the estimated performance metrics impact data may be obtained via surveys. For example, the project managers may be surveyed to assign an estimated impact to the current performance metrics data. The estimated impact for a performance metrics attribute may be a value between 1 to 10, 1 to 100, or a descriptor such as low, medium, or high, or other descriptors or ranges. The estimated impact then may be applied to the current performance metrics data to obtain projected performance metrics data for a given project launch plan, as described earlier.

The data manager and UI 201 may interact with the modules 211, 213, and 215 to receive data and interact with the database 203 to store and retrieve the performance metrics data, the customer care data, and the project complexity data. The data manager and UI 201 may be configured to allow keying in of data such as project complexity survey data and customer care satisfaction survey data. The data manager and UI 201 may also provide an application program interface (API) to communicate with other systems such as a network operation system to allow automated data collection from the network operation system.

The database 203 may be configured to store the performance metrics data, the customer care data, and the project complexity data. The database 203 may be implemented as a single physical database or multiple physical databases, depending on the design choice. It may use object-oriented database, relational database, or other future database technologies. Although the database 203 may be closely coupled with other components of the data collection and aggregation module 200, the present disclosure may also allow a distributed configuration where the database 203 or part of the database 203 may be located remotely.

Figure 3:
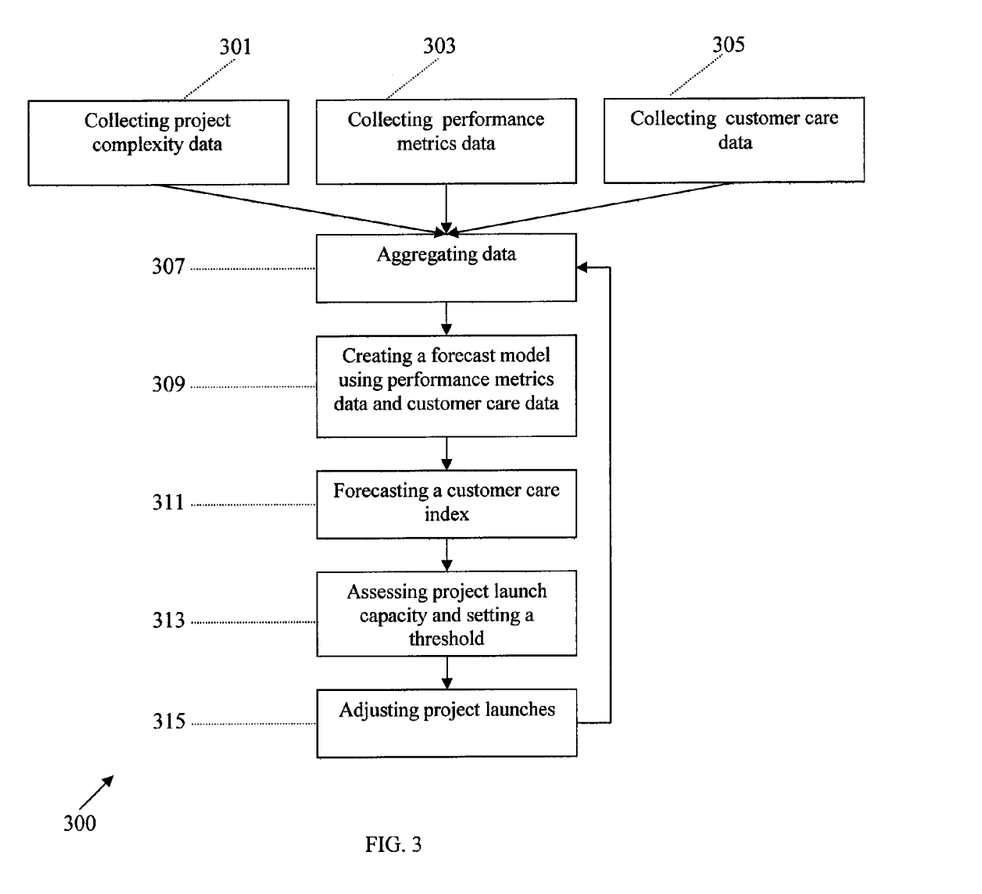
FIG. 3 illustrates a method for managing customer care complexity according to some embodiments of the present disclosure.

FIG. 3 illustrates a method 300 for managing customer care complexity according to some embodiments of the present disclosure. The method may include collecting project complexity attribute data at block 301, collecting performance metrics data at block 303, and collecting customer care data at 305. The method 300 may also include aggregating the data at block 307, creating a forecast model based on historical performance metrics data and historical customer care data at 309, forecasting a customer care index at block 311, assessing project launch capacity and setting a threshold at block 313, and adjusting the project launch plan at block 315.

Block 301 shows collecting project complexity data. Collecting project complexity data may include collecting estimated project complexity data for the current project launch plan and collecting historical project complexity data. As described earlier, the project complexity data includes a set of attributes that may affect the overall level of the complexity of the new project launch plan. The attributes may include the delivery method, the specialized knowledge, and the level of difficulty, among others. Collecting the estimated complexity data may involve surveying people such as project managers to get an estimated value for each attribute of project complexity. For example, the project managers may indicate level of difficulty as low, medium, or high. Multiple surveys may be aggregated and averaged to get a value for one attribute such as the difficulty level. Collecting historical project complexity data may involve retrieving the previous project complexity data for the previous weeks to arrive at an accumulated or pipeline project complexity index.

Block 303 shows collecting performance metrics data. Performance metrics data attributes, as described earlier, may include a number of incoming calls, a number of calls handled by the customer care specialist, and average handling time for each customer, among others, and may be used to measure the operation efficiency of the customer care operation. Collecting performance metrics data may include collecting historical performance metrics data and the current performance metrics data.

Block 305 shows collecting customer care data. Customer care data may include surveys of customer's satisfaction over launched projects and customer care specialist performance data. For example, the customer satisfaction data for a new promotion plan for a wireless service, for example, a push to talk feature, may include customer satisfaction over the feature itself, over the level of support customers receive, ease of use of the feature, and frequency of use, among others. The customer care data may also include survey data on customer care specialist performance. For example, the survey data may include level of satisfaction to specialist's attitude, the expertise demonstrated, and helpfulness on the issue involved, among others. A network carrier may employ a third party to conduct customer care surveys on a regular basis, after launch of the projects in a project launch plan.

Block 307 shows aggregating various types of data. Aggregating data may include aggregating the project complexity data, the performance metrics data, and the customer care data. Aggregating project complexity data may include aggregating project complexity of all the projects within a launch plan for the current week to arrive at an overall project complexity index. This may involve aggregating all complexity attributes for a project and arriving at a project-level project complexity index. The different complexity attributes may carry different weights. For example, the level of expertise required for the project may be more important than the delivery method, and a higher weight may be assigned to the level of expertise attribute. This process is repeated for each new project in the project launch plan for the given week and a set of project-wide project complexity indices is obtained. Different projects within the project launch plan may carry different weights. For example, one project may carry more weight because it is much larger in scale and may involve more resources than other projects in the project launch plan. Aggregating weighted projected project complexity indices may lead to an overall project complexity index for the project launch plan. Project complexity indices of the project launch plans of previous weeks may be aggregated to arrive at a pipeline project complexity index.

Aggregating performance metrics data may include aggregating performance metrics data for the current week or for the previous weeks, depending on the use of the performance metrics data. Some of the performance metrics data may be collected on an hourly or daily basis. This may be a granularity level too fine for some applications. The data may need to be aggregated to a granularity level of a weekly basis. Then the hourly or daily performance metrics data may be aggregated to arrive at a weekly performance metrics data for each attribute of the performance metrics data.

Block 309 shows creating a forecast model to forecast a customer care index. Creating a forecast model may include correlating the historical performance metrics data and historical customer care index data to identify a predictive relationship between the historical performance metrics data and the historical customer care index data. In some embodiments, a statistical smoothing function may be used to smooth out short-term fluctuations and to obtain a long-term trend of the relationship. Once a correlation or statistical relationship is established between the two variables, a projected value of one variable may be obtained via interpolation. Creating the forecast model may also include calibrating the model. The statistical correlation model, once established, may need some calibration or tuning with more recent data. For example, the forecast model established using the historical performance metrics data and historical customer care index data may be calibrated using more recent performance metrics data. This may give recent data more weight in the model.

Block 311 shows forecasting a customer care index. Forecasting a customer care index for a new project launch plan may include plugging in the projected performance metrics data into the calibrated forecast model established at bock 309 to forecast a customer care index value for the new project launch plan. The projected performance metrics data may be obtained from the estimated impact of the new project launch plan on the current performance metrics data.

Block 313 shows assessing project launch capacity and setting a threshold. At this point, a pipeline project complexity index and a forecast customer care index value for the project launch plan are available from the other parts of the method 300. The forecast customer care index may be compared against a threshold value. For example, an acceptable threshold for the customer satisfaction level as indicated by the customer care index value may be set at a customer care index of 0.5, based on historical experiences or other criteria. In an embodiment, an initial threshold may be determined based on an analysis of historical complexity over a previous period of time, for example over the previous year and based on a general assessment of whether the complexity levels have been high, low, or about right over the previous year. For example, in one enterprise an average complexity level was determined for a prior operational period when complexity was known to be too high and the initial threshold was determined to be 75% of that average complexity level. Going forward, analysis and evaluation of operations and the customer care index, as well as other considerations, can be correlated with the threshold to tune and adjust the threshold.

A forecast customer care index value below the threshold may warrant a reconsideration of the project launch plan. A threshold on the overall pipeline project complexity index may also be set to gauge whether the new project launch plan may need any adjustment. The overall project complexity level may be inversely related to the performance of customer care specialists. The higher the project complexity level of the new project launch plan is, the greater the negative impact of the new project launch plan on the performance of customer care specialists. If the overall pipeline project complexity index is above an acceptable threshold value, then the new project launch plan may warrant a consideration for adjustment.

Block 315 shows adjusting the project launch plan. Adjusting the project launch plan may include making a decision on whether to change the project launch plan and what changes to make. For example, if the pipeline project complexity index proves to be substantially above an established threshold value or the forecast customer care index value is considerably below an acceptable threshold value, a decision may be made to adjust the project launch plan. The adjustments may include eliminating one or more projects from the launch plan, pushing one or more projects to a later launch window, and reordering the projects within the launch plan, among others. Once the changes are made, the method 300 is repeated to re-assess the pipeline project complexity index and the customer care index, until either the project complexity index or forecast customer care index value reaches a desired level. Under other conditions, the above method 300 may indicate that a higher complexity index could be supported by customer care specialists without unacceptable diminishment of the customer care index, and the corrective action may be to add more projects to the launch plan.

Figure 4:
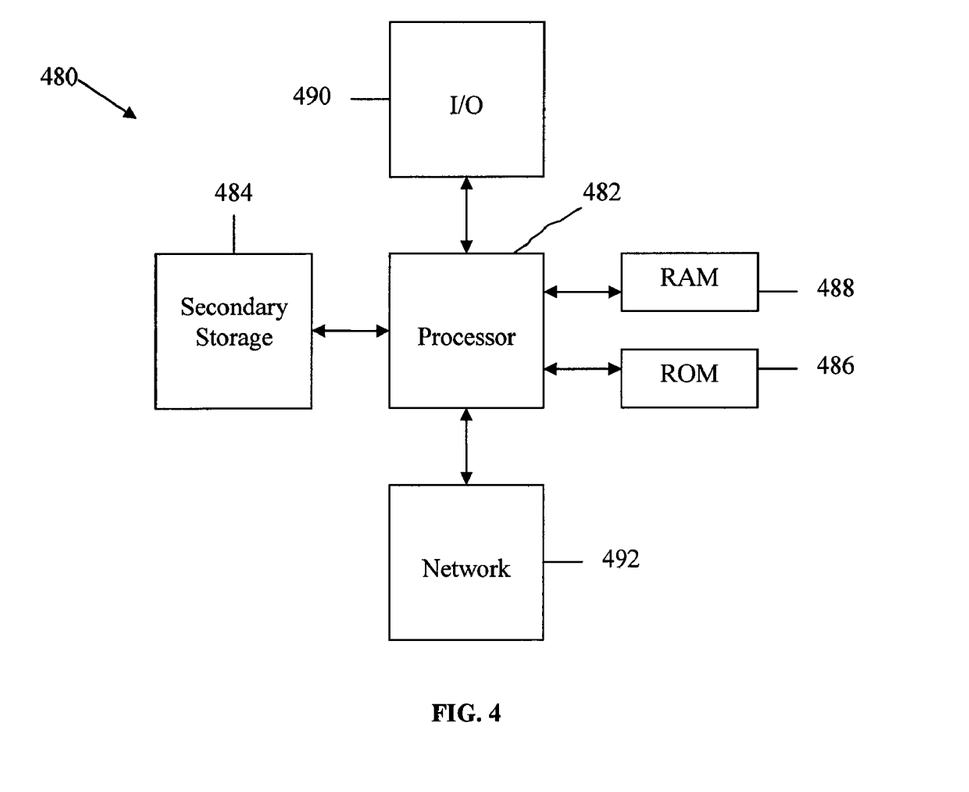
FIG. 4 illustrates an embodiment of an exemplary general-purpose computer system suitable for implementing the several embodiments of the disclosure.

FIG. 4 illustrates an exemplary general purpose computer system suitable for implementing the several embodiments of the disclosure. The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present.

Thus, while instructions may be discussed as executed by a processor, the instructions may be executed simultaneously, serially, or otherwise executed by one or multiple processors.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for customer care complexity management, comprising:
   a processor;
   a project complexity module that, when executed by the processor, is configured to produce an overall project complexity index based on a plurality of project complexity attribute data for a plurality of projects in a current project launch plan, wherein the plurality of project complexity attribute data comprises an efficiency time period, a special knowledge requirement of the customer care specialist, a difficulty level, an other organization involvement, a device complexity, a feature complexity, and a dependency level, and wherein at least some of the plurality of project complexity attribute data are weighted differently to arrive at the overall project complexity index;
   a pipeline complexity module that, when executed by the processor, is configured to produce a pipeline project complexity index by aggregating the overall project complexity index for the plurality of projects in the current project launch plan and project complexity indices of previous project launch plans;
   a customer care index forecast module that, when executed by the processor, is configured to:
      establish a customer care index forecast model based on a plurality of historical customer care data and based on a plurality of historical performance metrics data, and
      forecast a customer care index using the established customer care index forecast model and using a plurality of projected performance metrics data for the current project launch plan; and
   a project launch capability assessment and threshold module that, when executed by the processor, is configured to identify an adjustment to the current project launch plan when at least one of the forecast customer care index is below a first threshold and the pipeline project complexity index is above a second threshold, wherein the adjustment to the current project launch plan comprises at least one of moving one or more of the plurality of projects in the current project launch plan into a different launch window, reordering one or more of the plurality of projects in the current project launch plan, and dropping one or more of the plurality of projects from the current launch plan.

2. The system of claim 1, further comprising a data collection and aggregation module that is executed by the processor.

3. The system of claim 2, wherein the data collection and aggregation module comprises a performance metrics data collection and aggregation module, a project complexity data collection and aggregation module, and a customer care data collection and aggregation module.

4. The system of claim 3, wherein the performance metrics data collection and aggregation module is configured to collect and aggregate the plurality of projected performance metrics data and the plurality of historical performance metrics data.

5. The system of claim 4, wherein the plurality of historical performance metrics data comprises incoming calls, handled calls, a handled call rate, a customer wait time, an average handling time, an available staff, an average customer retention rate, an actual customer activation rate, and a credit adjustment.

6. The system of claim 3, wherein the project complexity data collection and aggregation module is configured to collect and aggregate a plurality of project complexity survey data and historical project complexity attribute data.

7. The system of claim 3, wherein the customer care data collection and aggregation module is configured to collect the plurality of historical customer care data.

8. The system of claim 7, wherein the customer care data comprise a plurality of customer satisfaction data and a plurality of customer care specialist performance data.

9. The system of claim 1, wherein the customer care index forecast module is configured with a correlation algorithm to identify a statistical relationship between the plurality of historical performance metrics data and the plurality of customer care data.

10. The system of claim 1, wherein the customer care index forecast module is configured with an exponential smoothing function to smooth out short-term fluctuations and to obtain a long-term trend of the customer care index.

11. The system of claim 1, wherein the plurality of project complexity attribute data further comprises a customer care delivery method, a policy statement impact, an initiative type, and an old initiative replacement.

12. The system of claim 1, wherein at least some of the plurality of projects in the current project launch plan are weighted differently to arrive at the overall project complexity index.

13. The system of claim 2, wherein upon the adjustment being made to the current project launch plan which results in an adjusted project launch plan,
   the data collection and aggregation module is configured to collect a new plurality of estimated performance metrics data based on the adjusted project launch plan,
   the project complexity module is further configured to produce an overall project complexity index based on a plurality of project complexity attribute data for a plurality of projects in the adjusted project launch plan;
   the pipeline complexity module is further configured to produce a second pipeline project complexity index based on the overall project complexity index for the plurality of projects in the adjusted project launch plan and project complexity indices of previous project launch plans; and
   the customer care index and forecast module is further configured to:

produce a second forecast customer care index based on the established customer care index forecast model and based on the new plurality of estimated performance metrics data for the adjusted project launch plan, and identify and make a second adjustment to the project launch plan when at least one of the second forecast customer care index is below the first threshold and the second pipeline project complexity index is above the second threshold.

14. A method for customer care complexity management, comprising:

collecting, by a data collection and aggregation module stored on a non-transitory computer readable medium and executable by a processor, a plurality of historical performance metrics data, a plurality of estimated performance metrics data for a current project launch plan, and a plurality of customer care data;

producing, by a project complexity module stored on a non-transitory computer readable medium and executable by a processor, an overall project complexity index based on a plurality of project complexity attribute data for a plurality of projects in the current project launch plan, wherein the plurality of project complexity attribute data comprises an efficiency time period, a special knowledge requirement of the customer care specialist, a difficulty level, an other organization involvement, a device complexity, a feature complexity, and a dependency level, and wherein at least some of the plurality of project complexity attribute data are weighted differently to arrive at the overall project complexity index;

producing, by a pipeline complexity module stored on a non-transitory computer readable medium and executable by a processor, a first pipeline project complexity index by aggregating the overall project complexity index for the plurality of projects in the current project launch plan and project complexity indices of previous project launch plans;

establishing, by a customer care index forecast module stored on a non-transitory computer readable medium and executable by a processor, a customer care index forecast model using the plurality of historical performance metrics data and using the plurality of customer care data;

producing, by the customer care index forecast module, a first forecast customer care index based on the established customer care index forecast model and based on the plurality of estimated performance metrics data for the current project launch plan; and identifying, by a project launch capability assessment and threshold module stored on a non-transitory computer readable medium and executable by a processor, an adjustment to the current project launch plan when at least one of the first forecast customer care index is below a first threshold and the first pipeline project complexity index is above a second threshold, wherein the adjustment to the current project launch plan comprises at least one of moving one or more of the plurality of projects in the current project launch plan into a different launch window, reordering one or more of the plurality of projects in the current project launch plan, and dropping one or more of the plurality of projects from the current launch plan.

15. The method in claim 14, further comprising:
making the adjustment to the current project plan which results in an adjusted project launch plan;

collecting, by the data collection and aggregation module, a new plurality of estimated performance metrics data based on the adjusted project launch plan;

producing, by the project complexity module, an overall project complexity index based on a plurality of project complexity attribute data for a plurality of projects in the adjusted project launch plan;

producing, by the pipeline complexity module, a second pipeline project complexity index based on the overall project complexity index for the plurality of projects in the adjusted project launch plan and project complexity indices of previous project launch plans;

producing, by the customer care index forecast module, a second forecast customer care index based on the established customer care index forecast model and based on the new plurality of estimated performance metrics data for the adjusted project launch plan; and identifying and making, by the project launch capability assessment and threshold module, a second adjustment to the adjusted project launch plan when at least one of the second forecast customer care index is below the first threshold and the second pipeline project complexity index is above the second threshold.

16. The method of claim 14, wherein establishing the customer care index forecast model comprises correlating the plurality of historical performance metrics data with the plurality of customer care data and identifying a regression model that is configured to output a set of forecast customer care index using a set of projected performance metrics data.

17. A method for customer care complexity management, comprising:

collecting, by a data collection and aggregation module stored on a non-transitory computer readable medium and executable by a processor, a plurality of historical performance metrics data, a plurality of estimated performance metrics data for a current project launch plan, a plurality of historical project complexity data for previous project launches, a plurality of estimated project complexity data for a plurality of projects in the current project launch plan, and a plurality of customer care data;

producing, by a project complexity module stored on a non-transitory computer readable medium and executable by a processor, an overall project complexity index based on the plurality of estimated project complexity data for a plurality of projects in the current project launch plan, wherein the plurality of estimated project complexity data comprises an efficiency time period, a special knowledge requirement of the customer care specialist, a difficulty level, an other organization involvement, a device complexity, a feature complexity, and a dependency level, and wherein at least some of the plurality of estimated project complexity data are weighted differently to arrive at the overall project complexity index;

producing, by a pipeline complexity module stored on a non-transitory computer readable medium and executable by a processor, a pipeline project complexity index by aggregating the overall project complexity index for the plurality of projects in the current project launch and project complexity indices of previous project launch plans;

establishing, by a customer care index forecast module stored on a non-transitory computer readable medium and executable by a processor, a customer care index forecast model using the plurality of historical performance metrics data and using the plurality of customer care data;

producing, by the customer care index forecast module, a forecast customer care index based on the customer care index forecast model and based on the plurality of estimated performance metrics data for the current project launch plan; and identifying and making, by a project launch capability assessment and threshold module stored on a non-transitory computer readable medium and executable by a processor, an adjustment to the current project launch plan when at least one of the forecast customer care index is below a first threshold and the pipeline project complexity index is above a second threshold, wherein the adjustment to the current project launch plan comprises at least one of moving one or more of the plurality of projects in the current project launch plan into a different launch window, reordering one or more of the plurality of projects in the current project launch plan, and dropping one or more of the plurality of projects from the current launch plan.

18. The method of claim 17, wherein identifying the adjustment to the current project launch plan comprises identifying a new project launch plan that results in a second pipeline project complexity index that is below the second threshold.

* * * * *